(12) United States Patent
Sbriccoli et al.

(10) Patent No.: US 11,086,667 B2
(45) Date of Patent: Aug. 10, 2021

(54) SELECTIVE SCHEDULING OF CLOUD MAINTENANCE TASKS

(71) Applicant: International Business Machines Corporation, Armonk, NY (US)

(72) Inventors: Maria Sbriccoli, Rome (IT); Marco Martino, Rome (IT); Roberto Ragusa, Rome (IT); Pasquale Maria Mascolo Montenero, Barletta (IT)

(73) Assignee: International Business Machines Corporation, Armonk, NY (US)

(*) Notice: Subject to any disclaimer, the term of this patent is extended or adjusted under 35 U.S.C. 154(b) by 111 days.

(21) Appl. No.: 16/437,723

(22) Filed: Jun. 11, 2019

(65) Prior Publication Data
US 2020/0394069 A1    Dec. 17, 2020

(51) Int. Cl.
*G06F 9/48*      (2006.01)
*H04L 29/08*    (2006.01)

(52) U.S. Cl.
CPC ............ *G06F 9/4881* (2013.01); *H04L 67/10* (2013.01)

(58) Field of Classification Search
CPC .... G06F 9/4881; G06F 9/4843; G06F 9/5027; G06F 9/48881
See application file for complete search history.

(56) References Cited

U.S. PATENT DOCUMENTS

| | | | |
|---|---|---|---|
| 9,003,401 B2 | 4/2015 | Dain | |
| 9,253,059 B2 | 2/2016 | Branson et al. | |
| 9,740,535 B2 | 8/2017 | Crudele et al. | |
| 2012/0271949 A1 | 10/2012 | Radhakrishnan et al. | |
| 2017/0006116 A1 | 1/2017 | Kelly et al. | |
| 2017/0201569 A1 | 7/2017 | Fu et al. | |
| 2018/0150341 A1* | 5/2018 | Pan | G06F 9/547 |
| 2019/0236516 A1* | 8/2019 | Ponnusamy | G06Q 10/06393 |

* cited by examiner

*Primary Examiner* — Dong U Kim
(74) *Attorney, Agent, or Firm* — Timothy T. Singleton

(57) ABSTRACT

A method for selective scheduling and deployment of maintenance tasks in cloud computing environments is provided. The method determines a computing environment in which a maintenance task is to be performed. The computing environment has one or more environment characteristics. The method then determines one or more task characteristics for the maintenance task. Based on the one or more environment characteristics and the one or more task characteristics, the method determines a similarity between the maintenance task and one or more historical maintenance tasks. The method generates a completion indicator for the maintenance task based on the similarity between the maintenance task and the one or more historical maintenance tasks. Based on the completion indicator, the method schedules performance of the maintenance task.

14 Claims, 7 Drawing Sheets

SELECTIVE SCHEDULING OF CLOUD MAINTENANCE TASKS

BACKGROUND

Computer systems and communications networks enable data hosting, storing, processing, and distribution services across varied network resources. Cloud computing may be understood as providing such services via a communications infrastructure, such as the internet, instead of a local server or personal computer. Updates and maintenance tasks may be deployed to cloud computing resources or environments from centralized or distributed computing resources. These updates and maintenance tasks may periodically delay or prevent access to cloud resources during downtime while the cloud resource is being updated.

SUMMARY

According to an embodiment described herein, a computer-implemented method for data and task deployment in cloud computing environments is provided. The data and task deployment may by performed by determining a computing environment in which a maintenance task is to be performed. The computing environment may have one or more environment characteristics. The method determines one or more task characteristics of the maintenance task. Based on the one or more environment characteristics and the one or more task characteristics, the method determines a similarity between the maintenance task and one or more historical maintenance tasks. The method generates a completion indicator for the maintenance task based on the similarity between the maintenance task and the one or more historical maintenance tasks. Based on the completion indicator, the method schedules performance of the maintenance task for the computing environment.

Some embodiments of the inventive concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating or transporting the program for use, by, or in connection, with the instruction execution system, apparatus, or device.

DETAILED DESCRIPTION

Figure 1:
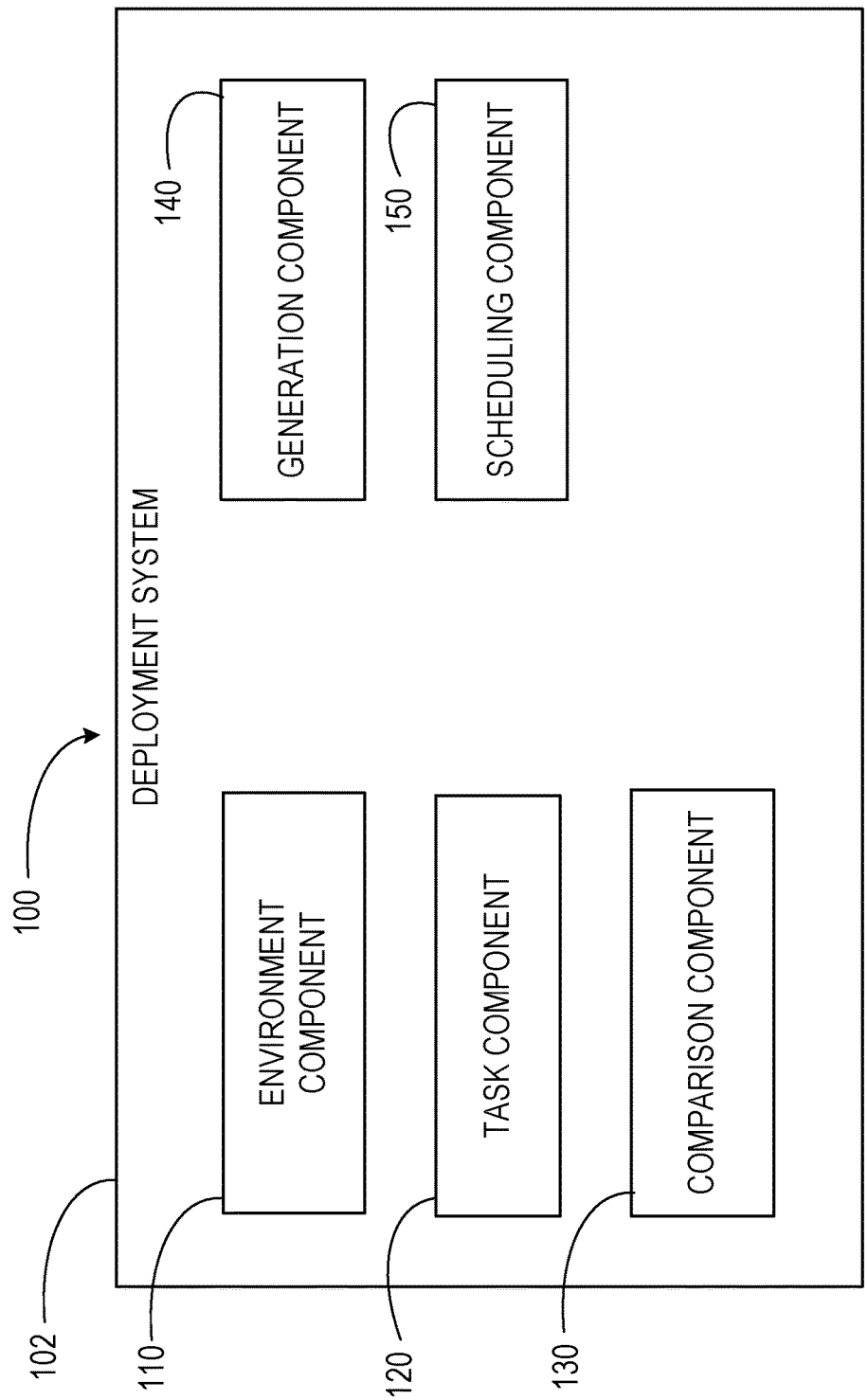
FIG. 1 depicts a block diagram of a computing environment for implementing concepts and computer-based methods, according to at least one embodiment.

The present disclosure relates generally to a method for managing cloud computing resources, but not exclusively, to a computer-implemented method for selective scheduling and deployment of maintenance tasks within cloud computing systems and across cloud computing resources. The present disclosure relates further to a related system for data and task deployment in a cloud computing environment, and a computer program product.

Maintenance and updating are routinely performed on cloud computing environments and resources. Such tasks limit access to cloud resources and cause delays. Maintenance and updating tasks may have varying durations depending on a multitude of factors including a size of the computing environment, a system load, network traffic, a size of the update, and other factors. Given the varying times of updates, maintenance scheduling programs often estimate durations for maintenance tasks and operations. Some of these programs schedule or otherwise allocate times that are larger than required for a given maintenance or updating task. Such over-scheduling may result in access difficulties for users, delays of other software deployments, and other access related problems.

Some scheduling programs consider a user or cloud resource calendar. Estimation of durations may be provided by a parent change request. In order to forecast an actual duration of maintenance or update deployments, embodiments of the present disclosure may leverage ad-hoc interpretations and determinations of historical data, including previous cloud resources and updates or maintenance thereto. Embodiments of the present disclosure also incorporate variable factors and fixed factors in estimating deployment durations. As such, embodiments of the present disclosure minimize or reduce durations of downtime and maintenance tasks. Further embodiments of the present disclosure may increase or maximize success rates for such maintenance tasks.

Embodiments of the present disclosure provide a technical solution for traffic management and updating tasks for cloud computing resources. As will be discussed in more detail below, embodiments of the present disclosure present methods and systems for scheduling and deploying updates and maintenance tasks.

According to an embodiment described herein, a computer-implemented method for data and task deployment in cloud computing environments is provided. The data and task deployment may by performed by determining a computing environment in which a maintenance task is to be performed. The computing environment may have one or more environment characteristics. The method determines one or more task characteristics of the maintenance task.

Based on the one or more environment characteristics and the one or more task characteristics, the method determines a similarity between the maintenance task and one or more historical maintenance tasks. The method generates a completion indicator for the maintenance task based on the similarity between the maintenance task and the one or more historical maintenance tasks. Based on the completion indicator, the method schedules performance of the maintenance task for the computing environment.

In some embodiments, determining the similarity between the maintenance task and the one or more historical maintenance tasks further comprises generating a similarity score. The similarity score may be generated based on the one or more environment characteristics of the computing environment, the one or more task characteristics of the maintenance task, and one or more historical characteristics of the one or more historical maintenance tasks. In some instances, generating the similarity score includes calculating a ratio of numerical values for the one or more environment characteristics, the one or more task characteristics, and the one or more historical characteristics. Generating the similarity score may also include determining a summand for nonnumerical values of the one or more environment characteristics, the one or more maintenance characteristics, and the one or more historical characteristics. In some embodiments, generating the similarity score includes combining a ratio of numerical values and a summand for nonnumerical values for the one or more environment characteristics, the one or more maintenance characteristics, and the one or more historical characteristics.

In some embodiments, the method generates a completion indicator by estimating a total duration of a maintenance task based on a generated similarity score. The method may also estimate a likelihood of success of the maintenance task based on the similarity score and a historical success rate for the one or more historical maintenance tasks.

In some embodiments, the method schedules performance of a maintenance task by determining one or more available times for performing a maintenance task based on an event schedule for the computing environment and a total duration estimated for the maintenance task. The method may also reserve at least a portion of time of the one or more available times for performing the maintenance task. The reservation may be created within the event schedule for the computing environment Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may comprise a deployment system 102. The deployment system 102 may comprise an environment component 110, a task component 120, a comparison component 130, a generation component 140, and a scheduling component 150. The environment component 110 determines characteristics of a computing environment on which a maintenance task is to be performed. The task component 120 determines characteristics associated with maintenance tasks. The comparison component 130 determines similarities between current and historical maintenance tasks and computing environments on which the maintenance tasks were or are to be performed. The generation component 140 generates completion indicators for a maintenance task based on identified similarities to historical maintenance tasks. The scheduling component 150 schedules performance of maintenance tasks within computing environments based on completion indicators. Although described with distinct components, it should be understood that, in at least some embodiments, components may be combined or divided, or additional components may be added, without departing from the scope of the present disclosure.

Figure 2:
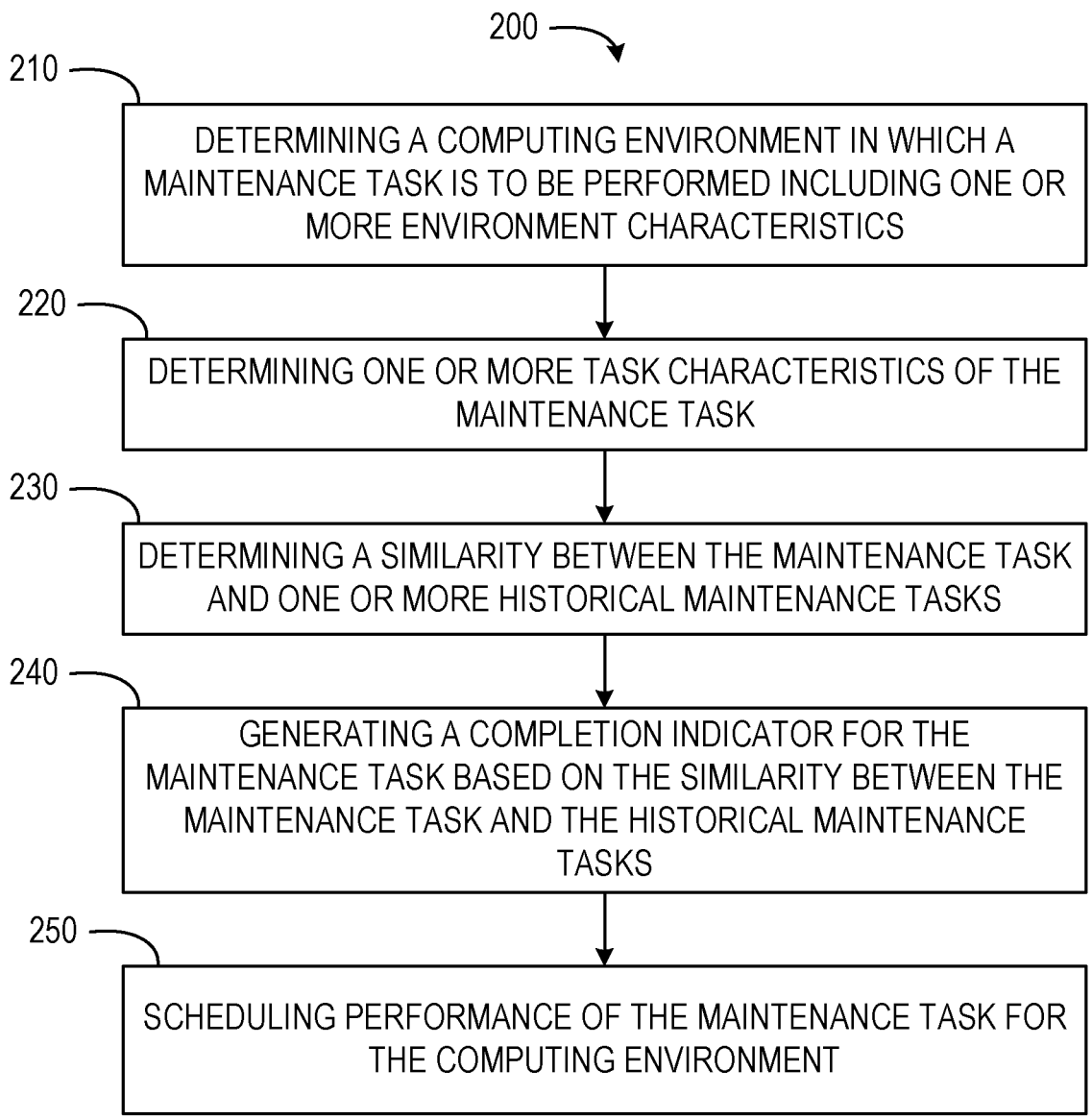
FIG. 2 depicts a flow diagram of a computer-implemented method for selective scheduling and deployment of maintenance tasks in cloud computing environments, according to at least one embodiment.

Referring now to FIG. 2, a flow diagram of a computer-implemented method 200 is shown. The computer-implemented method 200 is a method for selective scheduling and deployment of maintenance tasks in cloud computing environments. In some embodiments, the computer-implemented method 200 may be performed by one or more components of the computing environment 100, as described in more detail below.

At operation 210, the environment component 110 determines a computing environment in which a maintenance task is to be performed. In some embodiments, the computing environment has or is defined by one or more environment characteristics. The environment component 110 may determine the computing environment by accessing the computing environment. In some instances, the environment component 110 accesses the computing environment in response to an update request or a task request from the computing environment. The environment component 110 may also access the computing environment in response to an update or task prompt from a maintenance server or another component of the deployment system 102. The request or prompt may identify the computing environment to be accessed. For example, the request or prompt may indicate a network address, a location, or other identifying information by which the environment component 110 identifies and accesses the computing environment. In some embodiments, the environment component 110 determines the computing environment and the one or more environment characteristics without directly accessing the computing environment. For example, the request or prompt may include identifying information (e.g., a profile identifier) causing the environment component 110 to access a record of the deployment system 102. The record of the deployment system 102 may indicate the one or more environment characteristics of the computing environment. In some embodiments, the environment characteristics may include a number of nodes of the computing environment, a geographic location of the computing environment, a data center location, a time zone of the computing environment or customer, an update schedule or event schedule of the computing environment, a last update of the computing environment, a number of days since a last update, a current software version of the computing environment, a current available space of the computing environment, a current used space of one or more software programs stored on the computing environment, combinations thereof, and any other suitable environment characteristics defining or describing aspects of the computing environment. The software programs stored on the computing environment may be associated with the maintenance task.

At operation 220, the task component 120 determines one or more task characteristics of the maintenance task. In some embodiments, the task component 120 determines the one or more task characteristics based on a prompt of a component of the deployment system 102. For example, when an update or deployment for software, applications, or other data is prompted, the component of the deployment system 102 may pass data or metadata defining or describing the maintenance task to the task component 120. The task component 120 may then identify, within the data or metadata, the one or more characteristics of the maintenance task. In some instances, the task component 120 determines the one or more task characteristics from a request received from the computing environment. In such instances, the request may include information relating to a current version or software release running on the computing environment. The task component 120 may identify the one or more task characteristics based on a comparison of the version or release information within the request and data or metadata of the maintenance task on a component of the deployment system 102.

In some embodiments, the one or more task characteristics include a current version of software associated with the maintenance task, a current size of the maintenance task, a current total size of software after completion of the maintenance task, a number of days since a last deployment, one or more external dependencies, operating requirements for the maintenance task, a number of nodes to which the maintenance task is to be applied, combinations thereof, or any other suitable characteristics defining or describing aspects of the maintenance task. The one or more task characteristics may be associated with the maintenance task. In some instances, the one or more task characteristics include aspects of a software program associated with the maintenance task or on which the maintenance task is to be performed.

At operation 230, the comparison component 130 determines a similarity between the maintenance task and one or more historical maintenance tasks. In some embodiments, the comparison component 130 determines the similarity based on the one or more environment characteristics, the one or more task characteristics, and one or more historical characteristics of the one or more historical maintenance tasks. The comparison component 130 may access the one or more historical maintenance tasks performed by one or more component of the deployment system 102. Similarly, the comparison component 130 may access the one or more historical maintenance tasks performed on the computing environment at issue or other computing environments. Once accessed, in some embodiments, the comparison component 130 compares the one or more historical maintenance tasks to the maintenance task identified in operations 210 and 220.

The comparison component 130 may determine the similarity between the maintenance task and the one or more historical maintenance tasks by comparing and contrasting similarities among characteristics of the maintenance task and at least a portion of the one or more historical maintenance tasks. The characteristics considered by the comparison component 130 may be fixed or variable. To provide a similarity determination, the comparison component 130 may determine common characteristics between the one or more environment characteristics, the one or more task characteristics, and the one or more historical characteristics. In some embodiments, the comparison component 130 disregards or discards from consideration characteristics which are not common to the environment and task characteristics and the historical characteristics. In some instances, the comparison component 130 applies weights to at least a portion of the common characteristics in determining the similarity between the maintenance task and the one or more historical maintenance tasks. For example, the comparison component 130 may prioritize or attribute greater weight to characteristics indicating similar computing environments for the maintenance task and a historical maintenance task. By way of further example, the comparison component 130 may prioritize or attribute greater weight to characteristics which indicate similarities between the tasks, operations, or updates being performed by the maintenance task and at least one of the one or more historical maintenance tasks.

In some embodiments, the comparison component 130 compares common characteristics without disregarding characteristics not shared among the environment and task characteristics and the historical characteristics. In such embodiments, the comparison component 130 may apply differing weights or values to differing characteristics based on whether the characteristic is included in both of the environment and task characteristics and the historical characteristics. For example, a higher relative weight may be applied to characteristics shared among the task characteristics and the historical characteristics, while a lower relative weight may be applied to characteristics existing only in one set of characteristics.

In some embodiments, the operation 230 may be performed by the comparison component 130 using one or more operations forming a comparison algorithm. An example comparison algorithm may be understood using the following pseudocode.

if parameter is a string do if strings are the same then value=value+1 else value=value+0 if parameter is a number do value=value+small number/big number #this is a factor between 0 and 1 value=value+(1−abs(new_$tz$−old_$tz$)/12) #if same hour+1,12 hours ago 0

As shown above, the comparison component 130 may identify similarities between tasks done on environments that are considered similar. The comparison component 130 may also identify similarities between tasks without regard to environment. Incorporating similarities between tasks and environments on which tasks are performed, the comparison component 130 may identify one or more sequences of deployments that are close enough to the maintenance task to estimate duration and reliability of performing the maintenance task. As noted above, weights may be applied to environments which are more similar to the environment characteristics associated with the current maintenance task. The weights may be dynamically generated and applied. In some embodiments, weights are determined and applied based on a similarity of environments of the maintenance task and a historical maintenance task.

At operation 240, the generation component 140 generates a completion indicator for the maintenance task based on the similarity between the maintenance task and the one or more historical maintenance tasks. In some embodiments, the completion indicator is generated by identifying at least one historical maintenance task which is suitably similar to the current maintenance task. The generation component 140 identifies whether the similar historical maintenance task was successfully completed or deployed. The generation component 140 may then cooperate with the comparison component 130 to generate and apply the completion indicator to the maintenance task. For example, in some instances, the generation component 140 receives an indication of similarity between the maintenance task and the selected historical maintenance task determined by the comparison component 130 to be similar to the maintenance task. The generation component 140 may then determine and indicate a likelihood of success for the maintenance task based on the success of the historical maintenance task and the similarity between the historical maintenance task and the current maintenance task.

At operation 250, the scheduling component 150 schedules performance of the maintenance task for the computing environment. In some embodiments, the scheduling component 150 schedules the maintenance task based at least in part on the completion indicator. The scheduling component 150 may schedule the maintenance task for the computing environment when a likelihood of success, represented by the completion indicator, indicates the maintenance task is likely to be successfully deployed on the computing environment during a specified time or duration of time.

In some embodiments, the scheduling component 150 schedules performance of the maintenance task by blocking or selecting a portion of time within an event schedule for the computing environment. The scheduling component 150 may notify one or more administrators or users of the computing environment prior to or at the time of blocking the portion of time in the event schedule. In some instances, the scheduling component 150 requests scheduling of the maintenance task with an administrator or user of the computing environment.

Figure 3:
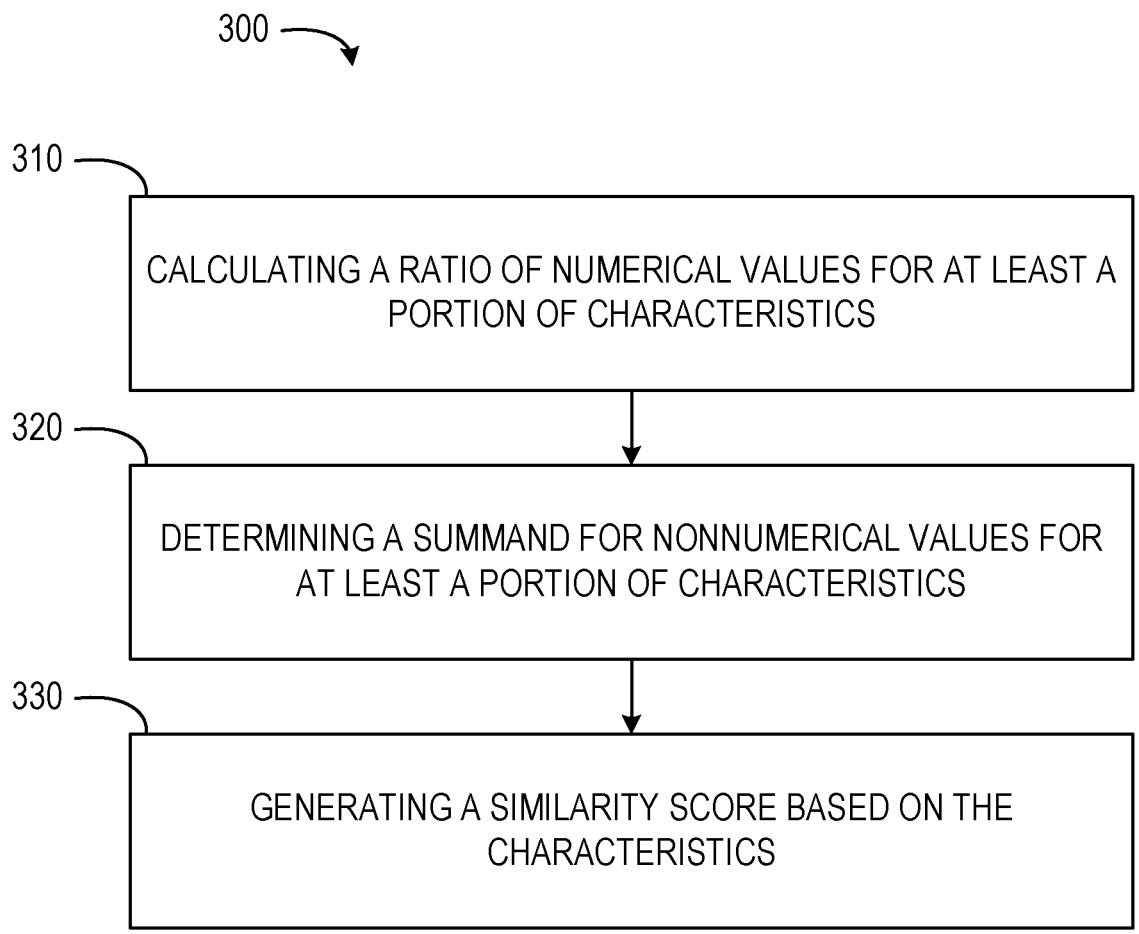
FIG. 3 depicts a flow diagram of a computer-implemented method for selective scheduling and deployment of maintenance tasks in cloud computing environments, according to at least one embodiment

FIG. 3 shows a flow diagram of an embodiment of a computer-implemented method 300 for selective scheduling and deployment of maintenance tasks in cloud computing environments. The method 300 may be performed by or within the computing environment 100. In some embodiments, the method 300 comprises or incorporates one or more operations of the method 200. In some instances, operations of the method 300 may be incorporated as part of or sub-operations of the method 200. For example, the operations of the method 300 may comprise all, part, or sub-operations of operation 230 of the method 200.

In operation 310, the comparison component 130 calculates a ratio of numerical values for at least a portion of the one or more environment characteristics, the one or more task characteristics, and the one or more historical characteristics. In some embodiments, the comparison component 130 combines the one or more event characteristics and the one or more task characteristics to form a set of job characteristics for the current maintenance task to be performed. The one or more historical characteristics may include characteristics relating to the historical maintenance task, which was previously performed, and characteristics describing or defining an environment in which the historical maintenance task was performed. The comparison component 130 may then compare the job characteristics and the historical characteristics.

The comparison component 130 may identify characteristics of the job characteristics and the historical characteristics which are associated with a numerical value. For example, characteristics associated with numerical values may include time zones, version numbers, days since last update, database size, number of nodes, combinations thereof, and any other suitable characteristics or aspects associated with numerical values. In some instances, characteristics may be coded to numerical values. In these instances, the comparison component 130 may identify the coded characteristics as being associated with numerical values and calculate appropriate ratios.

In an example, the job characteristics for a maintenance task may include a geographic location, a number of nodes, a data center location, a time zone, a new version designation, an old version designation, a number of days since last upgrade, a database size, and one or more external dependencies. These job characteristics may be formatted as shown below.

geo: us
num nodes: 12
datacenter: NYC
timezone: −05:00
new version: 6
old version: 4
upgrade days ago: 223
Database size: 1000000
external dependencies: pkg repo In the example above, the comparison component 130 may identify two historical maintenance tasks for comparison to the job characteristics. The historical maintenance tasks may be described with similar characteristics as that of the job characteristics. As shown below, the comparison component 130 may calculate comparison ratios for the numerical values included in the historical characteristics.

Historical Job #1 and Calculation of Similarity:
geo: us (=1)
num_nodes: 16 (=12/16=0.75)
datacenter: LosAngeles (=0)
time-zone: −08:00 (=1−3/12=0.75)
new version: 6 (=1)
old version: 3 (=3/4=0.75)
upgrade days ago: 120 (=120/223=0.55)
database size: 350000 (=350000/1000000=0.35)
external dep: pkg repo (=1)
execution time hours: 4.5
success: yes Historical Job #2 and Calculation of Similarity:
geo: eu (=0)
num_nodes: 12 (=12/12=1)
datacenter: Berlin (=0)
time-zone: +02:00 (=1−7/12=0.45)
new version: 5 (=5/6=0.83)
old version: 4 (=4/4=1.0)
upgrade days ago: 400 (=223/500=0.45)
database size: 200000 (=200000/1000000=0.2)
external dep: pkg repo (=1)
execution time hours: 8
success: no In operation 320, the comparison component 130 determines a summand for nonnumerical (e.g., qualitative) values for at least a portion of the one or more environment characteristics, the one or more task characteristics, and the one or more historical characteristics. In some embodiments, the comparison component 130 determines summands for nonnumerical values as described above with respect to operation 230. The comparison component 130 may evaluate nonnumerical values as strings, determining similarities of the strings and generating a numerical string score for those strings. The comparison component 130 may then incorporate the numerical string scores with the ratios calculated in operation 310.

In operation 330, the comparison component 130 generates a similarity score based on the one or more environment characteristics of the computing environment, the one or more task characteristics of the maintenance tasks, and one or more historical characteristics of the one or more historical maintenance tasks. In some embodiments, the comparison component 130 generates the similarity score using one or more of the ratio of numerical values, calculated in operation 310, and the summand for nonnumerical values, determined in operation 320. In some instances, the comparison component 130 generates the similarity score by combining the ratio of numerical values and the summand for nonnumerical values for the one or more environment characteristics, the one or more task characteristics, and the one or more historical characteristics.

In the example described above for the first and second historical jobs, the comparison component 130 may calculate differing similarity scores. As shown above, the comparison component 130 generates a similarity score of 6.15 for the first historical job and a similarity score of 4.93 for the second historical job.

Figure 4:
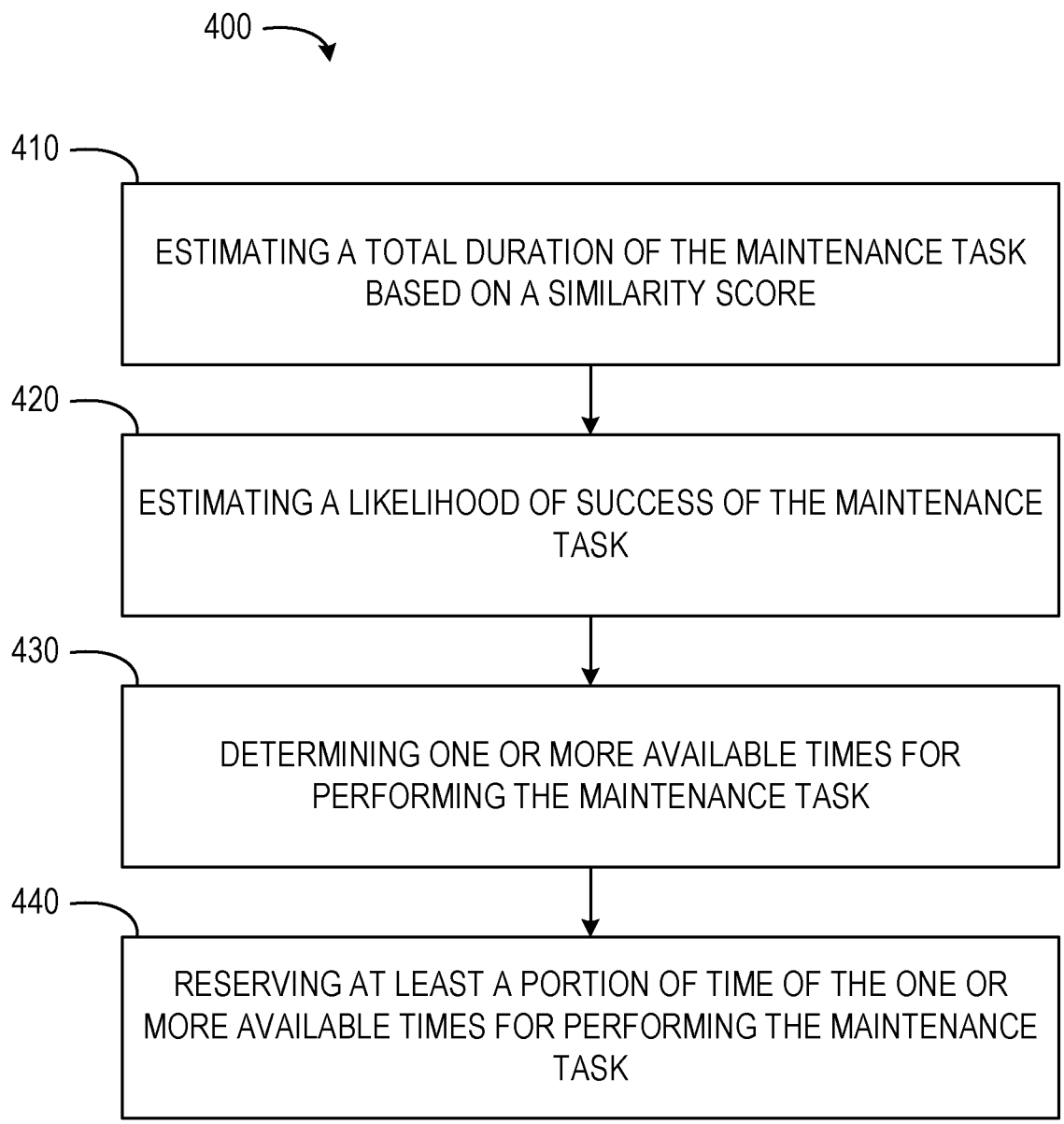
FIG. 4 depicts a flow diagram of a computer-implemented method for selective scheduling and deployment of maintenance tasks in cloud computing environments, according to at least one embodiment.

FIG. 4 shows a flow diagram of an embodiment of a computer-implemented method 400 for selective scheduling and deployment of maintenance tasks in cloud computing environments. The method 400 may be performed by or within the computing environment 100. In some embodiments, the method 400 comprises or incorporates one or more operations of the methods 200 or 300. In some instances, operations of the method 400 may be incorporated as part of or sub-operations of the methods 200 or 300.

In operation 410, the generation component 140 estimates a total duration of the maintenance task based on a similarity score. In some embodiments, the generation component 140 estimates a total duration of the maintenance task by incorporating execution times of similar historical maintenance tasks with similarity scores generated to compare the maintenance task with those historical maintenance tasks. For example, as discussed above, a first historical job has a similarity score of 6.15 and an execution time of 4.5 hours, and a second historical job may have a similarity score of 4.93 and an execution time of 8 hours. The generation component 140 may estimate the total duration of the maintenance task using ratios, averages, or any other suitable mathematical method. For the example described above, the generation component 140 may estimate the execution time as 6.05 hours through Equation 1.

$$(6.15*4.5+4.93*8)/(6.15+4.93)=67.115/11.08=6.05 \quad \text{Equation 1}$$

In operation 420, the generation component 140 estimates a likelihood of success of the maintenance task. In some embodiments, the generation component 140 estimates the likelihood of success based at least in part on the similarity score and a historical success rate for one or more historical maintenance tasks. The generation component 140 may apply a numerical value to a success rate of each historical job. Incorporating the similarity score and historical success rates, the generation component 140 may determine the likelihood of success using ratios, averages, or any other suitable manner. In some embodiments, using the example described above, the generation component 140 estimates a likelihood of success as 55% using Equation 2.

$$(6.15*1+4.93*0)/(6.15+4.93)=0.55 \quad \text{Equation 2}$$

In operation 430, the scheduling component 150 determines one or more available times for performing the maintenance task. In some embodiments, the available times are determined based on an event schedule for a computing environment. The scheduling component 150 may also consider or incorporate the total duration estimated for the maintenance task in determining available times. For example, where the scheduling component 150 identifies a first available time of 7 hours on a Wednesday, 6 hours on a Saturday, and 7 hours on a Sunday, the scheduling component 150 may disregard the available time on Saturday, being less than the estimated duration of the maintenance task. In some embodiments, the scheduling component 150 may also consider network stress, network traffic, business hours, and other accessibility considerations when evaluating the available times. For example, where the network traffic to the computing environment is higher, or past a specified traffic threshold, on Wednesday, and lower, or below a specified traffic threshold on Sunday, the scheduling component 150 may disregard the Wednesday time slot. Thus, based on time duration and network or resource usage aspects, the scheduling component 150 may select the available time on Sunday for deploying the maintenance task.

In operation 440, the scheduling component 150 reserves at least a portion of time of the one or more available times for performing the maintenance task. In some instances, the scheduling component 150 reserves the portion of time equal to the estimated duration of the maintenance task, determined by the generation component 140. The scheduling component 150 may also reserve a portion of time greater than the estimated duration. For example, the scheduling component 150 may reserve additional times based on an estimated latency, resource usage, or other speed metric associated with one or more of the computing environment or a network through which the deployment system 102 is to deploy the maintenance task to the computing environment.

Figure 5:
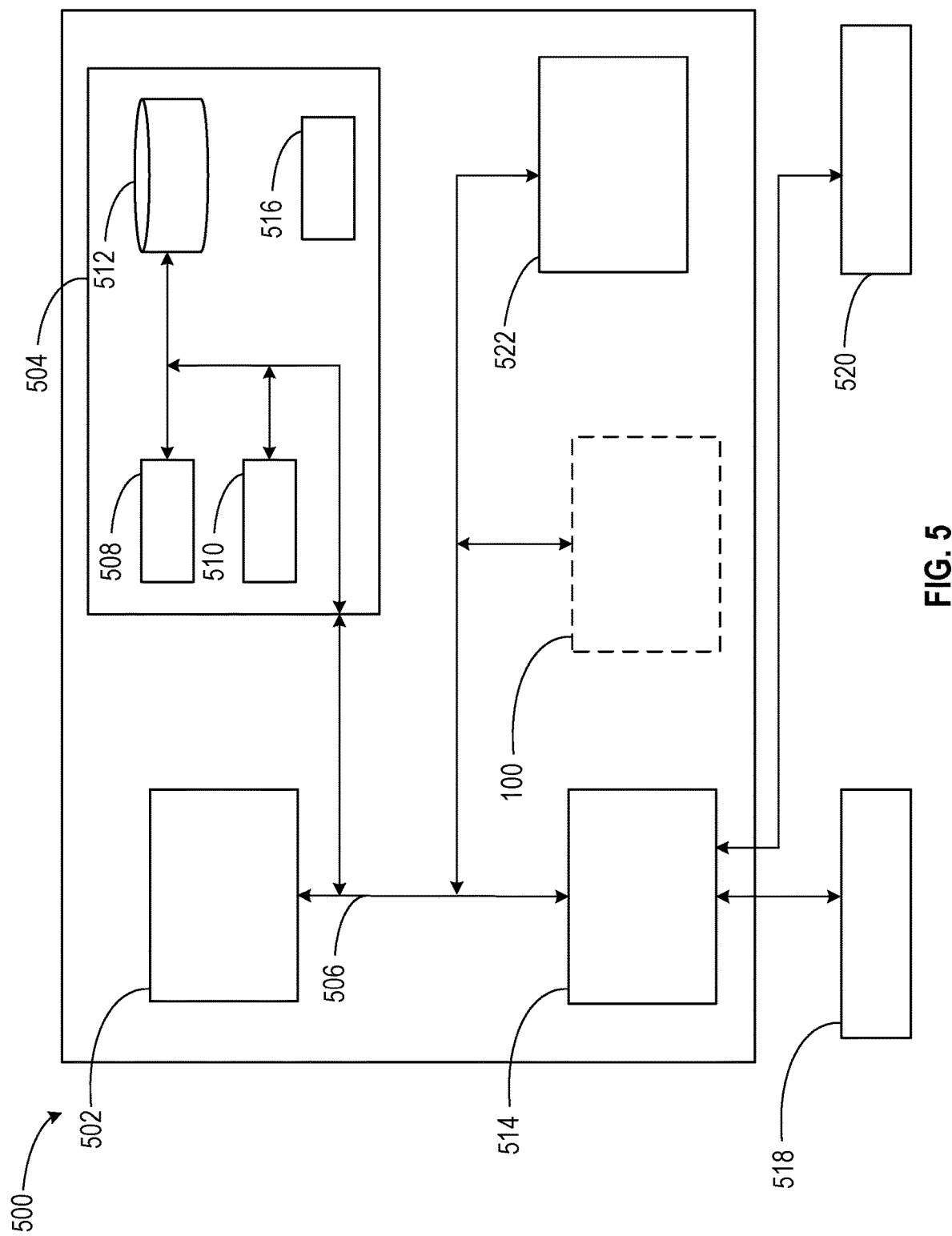
FIG. 5 depicts a block diagram of a computing system for task deployment, according to at least one embodiment.

Embodiments of the present disclosure may be implemented together with virtually any type of computer, regardless of the platform being suitable for storing and/or executing program code. FIG. 5 shows, as an example, a computing system 500 (e.g., cloud computing system) suitable for executing program code related to the methods disclosed herein and for task deployment.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the environment component 110, the task component 120, the comparison component 130, the generation component 140, and the scheduling component 150, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Figure 6:
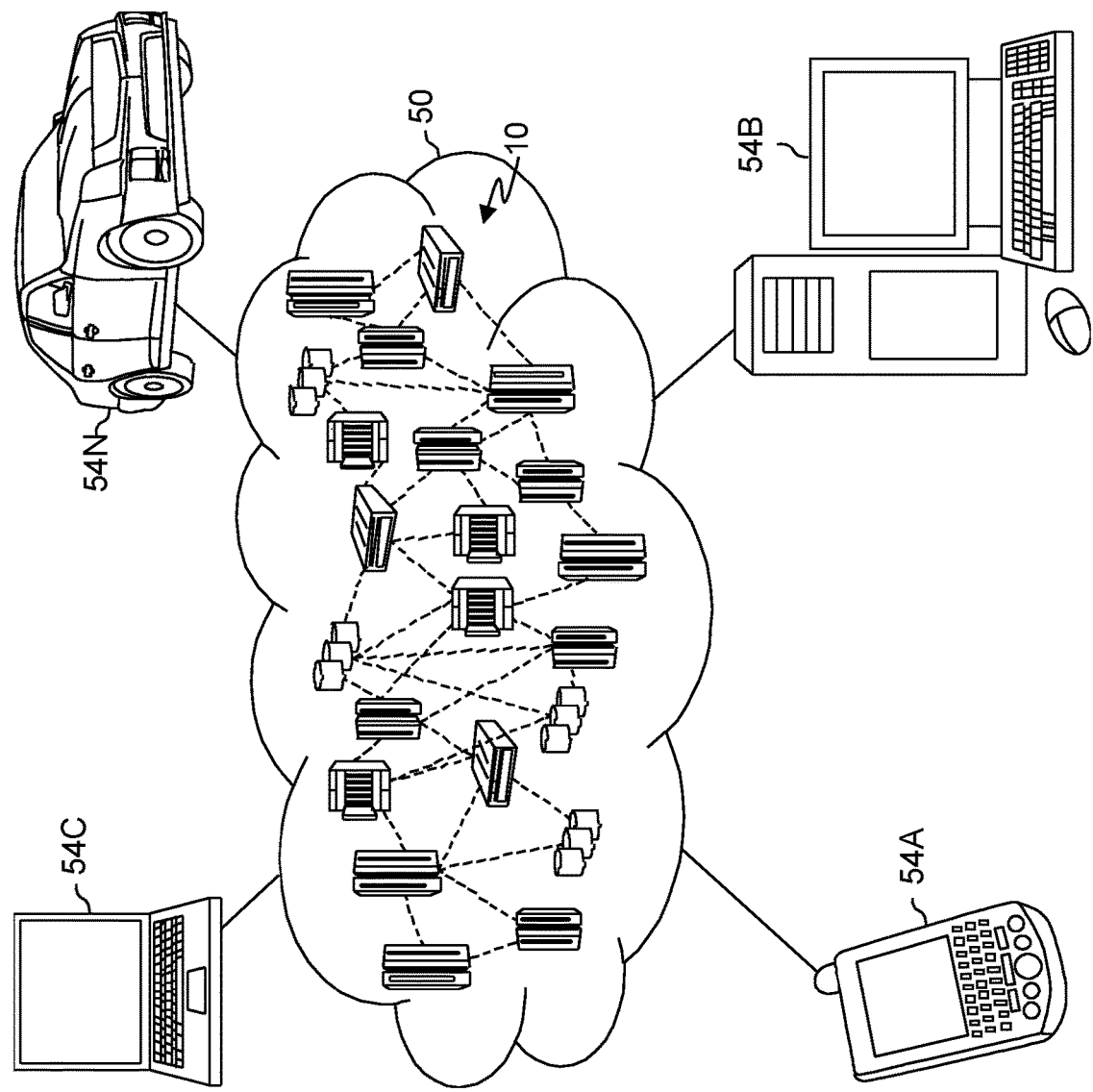
FIG. 6 is a schematic diagram of a cloud computing environment in which inventive concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
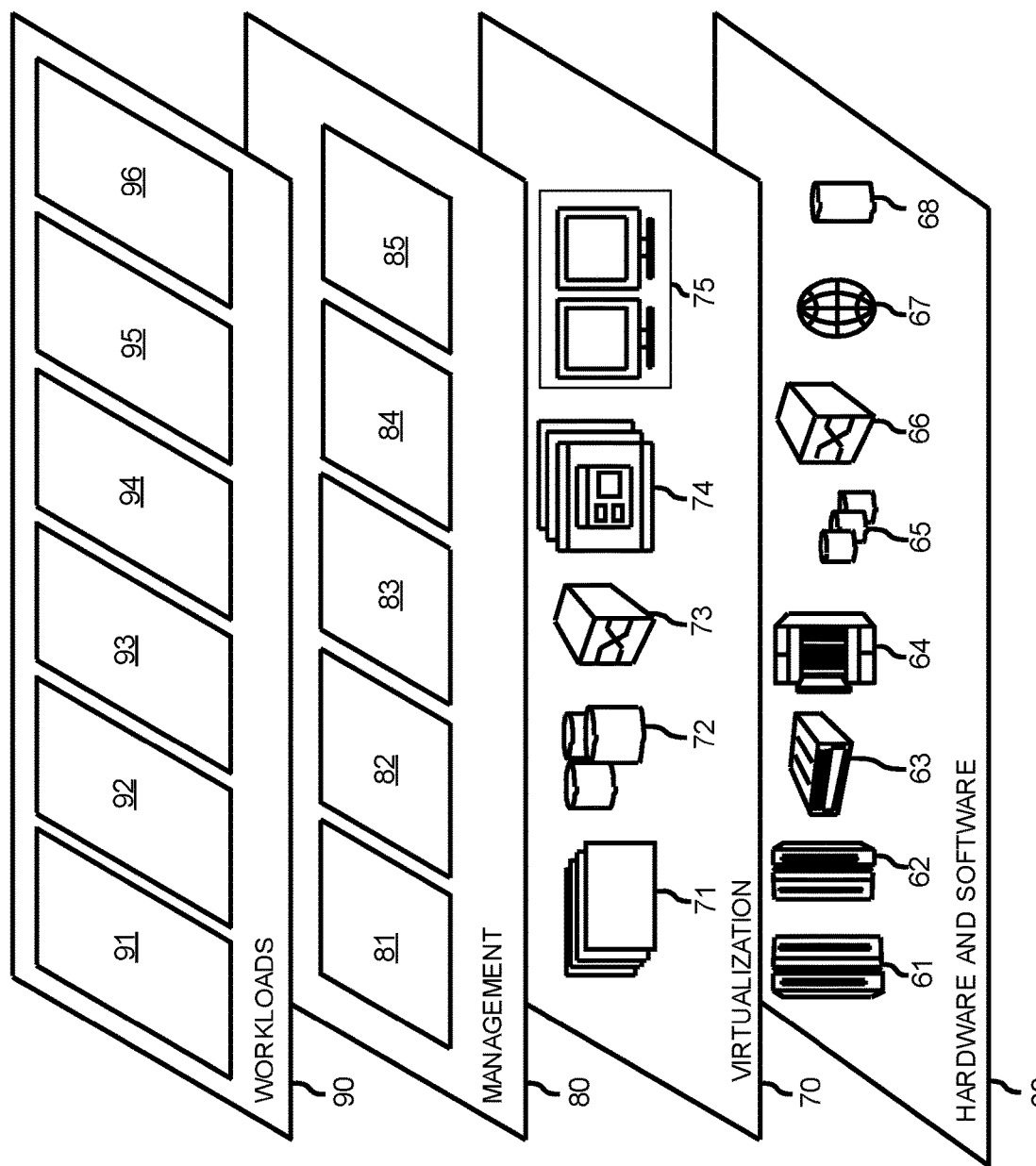
FIG. 7 is a diagram of model layers of a cloud computing environment in which inventive concepts of the present disclosure may be implemented, in accordance with an embodiment of the present disclosure.

Referring now to FIG. 7, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

What is claimed is:

1. A method, comprising:

determining a computing environment in which a maintenance task is to be performed, the computing environment having one or more environment characteristics;

determining one or more task characteristics of the maintenance task;

based on the one or more environment characteristics and the one or more task characteristics, determining a similarity between the maintenance task and one or more historical maintenance tasks by generating a similarity score by calculating a ratio of numerical values for the one or more environment characteristics of the computing environment, the one or more task characteristics of the maintenance task, and one or more historical characteristics of the one or more historical maintenance tasks;

generating a completion indicator for the maintenance task based on the similarity between the maintenance task and the one or more historical maintenance tasks; and based on the completion indicator, scheduling performance of the maintenance task for the computing environment.

2. The method of claim 1, wherein generating the similarity score further comprises determining a summand for nonnumerical values of the one or more environment characteristics, the one or more task characteristics, and the one or more historical characteristics.

3. The method of claim 2, wherein generating the similarity score further comprises combining the ratio of numerical values and the summand for nonnumerical values for the one or more environment characteristics, the one or more task characteristics, and the one or more historical characteristics.

4. The method of claim 1, wherein generating the completion indicator further comprises:

estimating a total duration of the maintenance task based on the similarity score; and estimating a likelihood of success of the maintenance task based on the similarity score and a historical success rate for the one or more historical maintenance tasks.

5. The method of claim 4, wherein scheduling performance of the maintenance task further comprises:

determining one or more available times for performing the maintenance task based on an event schedule for the computing environment and the total duration estimated for the maintenance task; and reserving at least a portion of time of the one or more available times for performing the maintenance task.

6. A system, comprising:

one or more processors; and a computer-readable storage medium, coupled to the one or more processors, storing program instructions that, when executed by the one or more processors, cause the one or more processors to perform operations comprising:

determining a computing environment in which a maintenance task is to be performed, the computing environment having one or more environment characteristics;

determining one or more task characteristics of the maintenance task;

based on the one or more environment characteristics and the one or more task characteristics, determining a similarity between the maintenance task and one or more historical maintenance tasks by generating a similarity score by calculating a ratio of numerical values for the one or more environment characteristics of the computing environment, the one or more task characteristics of the maintenance task, and one or more historical characteristics of the one or more historical maintenance tasks;

generating a completion indicator for the maintenance task based on the similarity between the maintenance task and the one or more historical maintenance tasks; and based on the completion indicator, scheduling performance of the maintenance task for the computing environment.

7. The system of claim 6, wherein generating the similarity score further comprises determining a summand for nonnumerical values of the one or more environment characteristics, the one or more task characteristics, and the one or more historical characteristics.

8. The system of claim 7, wherein generating the similarity score further comprises combining the ratio of numerical values and the summand for nonnumerical values for the one or more environment characteristics, the one or more task characteristics, and the one or more historical characteristics.

9. The system of claim 6, wherein generating the completion indicator further comprises:

estimating a total duration of the maintenance task based on the similarity score; and estimating a likelihood of success of the maintenance task based on the similarity score and a historical success rate for the one or more historical maintenance tasks.

10. The system of claim 9, wherein scheduling performance of the maintenance task further comprises:

determining one or more available times for performing the maintenance task based on an event schedule for the computing environment and the total duration estimated for the maintenance task; and reserving at least a portion of time of the one or more available times for performing the maintenance task.

11. A computer program product comprising a computer readable storage medium having program instructions embodied therewith, the program instructions being executable by one or more processors to cause the one or more processors to perform operations comprising:

determining a computing environment in which a maintenance task is to be performed, the computing environment having one or more environment characteristics;

determining one or more task characteristics of the maintenance task;

based on the one or more environment characteristics and the one or more task characteristics, determining a similarity between the maintenance task and one or more historical maintenance tasks by generating a similarity score by calculating a ratio of numerical values for the one or more environment characteristics of the computing environment, the one or more task characteristics of the maintenance task, and one or more historical characteristics of the one or more historical maintenance tasks;

generating a completion indicator for the maintenance task based on the similarity between the maintenance task and the one or more historical maintenance tasks; and based on the completion indicator, scheduling performance of the maintenance task for the computing environment.

12. The computer program product of claimer 11, wherein generating the similarity score further comprises determining a summand for nonnumerical values of the one or more environment characteristics, the one or more task characteristics, and the one or more historical characteristics.

13. The computer program product of claim 11, wherein generating the completion indicator further comprises:

estimating a total duration of the maintenance task based on the similarity score; and estimating a likelihood of success of the maintenance task based on the similarity score and a historical success rate for the one or more historical maintenance tasks.

14. The computer program product of claim 13, wherein scheduling performance of the maintenance task further comprises:

determining one or more available times for performing the maintenance task based on an event schedule for the computing environment and the total duration estimated for the maintenance task; and reserving at least a portion of time of the one or more available times for performing the maintenance task.

* * * * *